United States Patent [19]
Shaffer

[11] 3,880,768
[45] Apr. 29, 1975

[54] METHOD OF MAKING IMPROVED STRONTIUM MAGNESIUM PYROPHOSPHATE PHOSPHOR ACTIVATED BY DIVALENT EUROPIUM

[75] Inventor: Francis N. Shaffer, Towanda, Pa.

[73] Assignee: GTE Sylvania Incorporated, Stamford, Conn.

[22] Filed: Feb. 5, 1973

[21] Appl. No.: 329,627

[52] U.S. Cl............................................ 252/301.4 P
[51] Int. Cl.............................................. C09k 1/36
[58] Field of Search............................... 252/301.4 P

[56] References Cited
UNITED STATES PATENTS
3,484,383  12/1969  Hoffman................... 252/301.4 P
3,599,028  8/1971  Wanmaker.................. 252/301.4 P

*Primary Examiner*—Jack Cooper
*Attorney, Agent, or Firm*—Norman J. O'Malley; William H. McNeill; Donald R. Castle

[57] ABSTRACT

Divalent europium activated strontium magnesium pyrophosphate phosphors ($SrMgP_2O_7$:$Eu^{2+}$) having improved brightness when used in low pressure mercury vapor lamps are prepared by using $EuPO_4 \times H_2O$ as the europium source and firing in covered containers. Also disclosed is a novel method for preparing $EuPO_4 \times H_2O$.

2 Claims, No Drawings

METHOD OF MAKING IMPROVED STRONTIUM MAGNESIUM PYROPHOSPHATE PHOSPHOR ACTIVATED BY DIVALENT EUROPIUM

BACKGROUND OF THE INVENTION

Phosphors of the type with which this invention is concerned; i.e., divalent europium activated strontium magnesium pyrophosphate, are known in the art. See for example, "Philips Research Reports, Volume 22, No. 4, page 355," W. L. Wanmaker et al., published August 1967 and "Journal of the Electrochemical Society, Volume 115, No. 5, page 560," M. V. Hoffman, published May 1968. These phosphors peak at 393 nm at 26 nm bandwidth with good efficiency when suitably fired at close to the sintering point.

Such phosphors have previously been prepared from starting materials comprising $SrHPO_4$, $MgNH_4PO_4 \cdot H_2O$ and, as activator source, $Eu_2O_3$ plus $(NH_4)_2HPO_4$. When these materials are fired at temperatures in excess of 1,100°C a partial melt results forming a glass-like phase which cannot be reduced to a fine powder. When such materials are fired in covered containers at as high a temperature as possible without forming the glass-like sintered phase they are reducible to a fine powder and have efficient narrow band emission peaking at 393 nm when measured as phosphor plaques; however, when processed to a lamp coating, which involves mixing the phosphor with a lacquer slurry, coating the inside of the lamp tube and baking to remove the lacquer, these compositions retain considerable residual carbon that produces a darkened body color with a consequent decrease in brightness.

OBJECTS AND SUMMARY OF THE INVENTION

It is, therefore, an object of this invention to obviate the disadvantages of the prior art.

It is another object of this invention to enhance the emission characteristics of lamps using the subject phosphors.

Yet another object of this invention is the provision of a method of making improved phosphors.

Still another object of the invention is the provision of a method for making one of the raw materials employed in these improved phosphors.

These objects are accomplished in one aspect of the invention by the substitution of $EuPO_4 \times H_2O$ for $Eu_2O_3$ plus $(NH_4)_2HPO_4$ previously used as the source of the europium activator. This substitution allows the use of higher firing temperatures without the formation of a glass-like phase and provides a phosphor giving increased brightness when utilized in a lamp.

DESCRIPTION OF THE PREFERRED EMBODIMENTS

For a better understanding of the present invention, together with other and further objects, advantages and capabilities thereof, reference is made to the following disclosure and appended claims.

Referring now to the invention with greater particularity, it has been found that the substitution of $EuPO_4 \times H_2O$ for $Eu_2O_3$ plus $(NH_4)_2HPO_4$, when used in combination with $SrHPO_4$ and $MgNH_4PO_4 \cdot H_2O$ as homogeneous starting material mixtures allows increased firing temperatures during phosphor synthesis before melting occurs. Such new compositions when fired in the temperature range of 1,125°C to 1,150°C are hard, but free of the glass-like phase and friable to the extent that they can be mortared to a fine powder. Placque brightness of the new higher temperature fired composition using the $EuPO_4$ substitute is equal to the best previous preparations containing $Eu_2O_3$ plus $(NH_4)_2HPO_4$ used as a control. However, these new materials do not darken during the lacquer bake-out step of lamp fabrication when used as the phosphor coating of low pressure mercury lamps and remain at appreciably their original phosphor placque intensity. Under microscopic examination, the new higher temperature fired phosphors have improved particle clarity when compared with the prior art material. Further, the new phosphor exhibits less pits and fractures for the retention of residual carbon from the lacquer bake-out step.

The following non-limiting example is shown as exemplary of the composition and method:

EXAMPLE 1

As actual quantities of combining materials

| | |
|---|---|
| Strontium | 0.78$x$ gram atoms |
| Magnesium | 1.20$x$ gram atoms |
| Europium | 0.02$x$ gram atoms |
| Phosphate ($PO_4$) | 2.00$x$ gram moles | where $x$ equals any positive whole or fractional number.

As a specific example using the above concentrations 727 grams strontium diorthophosphate (98.58% $SrHPO_4$), 949 grams magnesium ammonium phosphate (98.2% $MgNH_4PO_4 \cdot H_2O$) and 27 grams europium phosphate (93.9% $EuPO_4$) were rendered to a homogeneous mixture by blending, passing through a micropulverizer and then reblending. This material was then first-step fired for about 2 hours at a cycling temperature ranging from 1,125°C to 1,150°C in covered 6 inch × 3 inch × 2 inch deep silica boats in a hydrogen-nitrogen atmosphere comprising about 5% hydrogen. The flow rate was about 20 liters per minute through a 4 inch diameter furnace tube. After the firing the material was cooled to near room temperature in the same atmosphere. At this stage, the first-step fired material was a very dense cake which was then broken down to a soft white powder in a porcelain mortar and sifted through a 200 mesh sieve. The material was then second-step fired for about 6 hours at a cycling temperature ranging from 1,125°C to 1,150°C (just under its melting temperature) in similar silica boats in a hydrogen-nitrogen atmosphere containing 25% hydrogen. The flow rate and furnace were the same as for the first-step firing. After the 6 hour firing step was completed the atmosphere was adjusted to 5% hydrogen and the boats cooled to near room temperature, after which they were removed from the furnace and exposed to air. The second-step fired material was also a very dense cake which was broken down to a soft white powder in a porcelain mortar with pestle and sifted through a 200 mesh sieve. When compared as placques with controls using phosphor prepared by the prior art compounds and method, the brightness of the new material, measured by comparing the relative emission intensity at the 393 nm band area under a constant 254 nm exciting source, was completely equal with the best samples thereof.

When applied as the phosphor coating of 40 watt test lamps in a milled lacquer suspension with the lacquer being baked off in the usual manner, the material of this example remained a white body color, and the finished lamp luminesced at an efficient level and showed excellent maintenance; both in excess of phosphor prepared by previous techniques.

The $EuPO_4$ used in the above-described example was prepared by adding about 15% in excess $PO_4$ over a molar equivalent as $(NH_4)_2HPO_4$ in hot solution to a hot $Eu(NO_3)_2$ solution. The pH of the resultant slurry was then adjusted to about 4.5 by the addition of $NH_4OH$, while maintaining agitation. The precipitated product, after decantation of the supernatant liquid, was washed with water on a Buchner funnel and then oven dried at 110°C to hexagonal $EuPO_4$ containing about 6% zeolitic water. The 15% excess $(NH_4)_2HPO_4$ provides ample phosphate to insure close to theoretical yield and at the pH range of 4.4 to 4.6 the ratio of Eu to $PO_4$ is 1:1. The drying temperature of 110°C should be considered near maximum as too high a drying temperature can drive off all the zeolitic water and convert the $EuPO_4$ structure from the unstable hexagonal form to the stable monoclinic form.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A method of making strontium magnesium pyrophosphate phosphor activated by divalent europium comprising the steps of: preparing a substantially homogeneous mixture of starting host materials consisting essentially of strontium diorthophosphate and magnesium ammonium phosphate and a starting activator material consisting essentially of europium phosphate as $EuPO_4 \times H_2O$ and heat treating said materials to form said phosphor, said heat treating comprising:

placing said homogeneous mixture in covered silica boats and first heat treating at a temperature between about 1,125°C to 1,150°C for about 2 hours in a first nitrogen-hydrogen atmosphere comprising about 5% hydrogen; cooling said mixture to about room temperature in said atmosphere; pulverizing the cake formed by said first heat treating in a porcelain mortar and sifting through a 200 mesh sieve; second heat treating said sieved mixture in covered silica boats at about 1,125°C to 1,150°C for about 6 hours in a nitrogen-hydrogen atmosphere comprising about 25% hydrogen; cooling said mixture to about room temperature in a nitrogen-hydrogen atmosphere comprising about 5% hydrogen; and pulverizing said cake in a porcelain mortar and sieving through a 200 mesh sieve.

2. The method of claim 1 wherein said homogeneous mixture includes at least $0.78x$ gram atoms of strontium; $1.20x$ gram atoms of magnesium; $0.02x$ gram atoms of europium; and $2.00x$ gram moles of phosphate and wherein $x$ is a positive number.

* * * * *